US007319994B1

(12) United States Patent
Sercinoglu

(10) Patent No.: US 7,319,994 B1
(45) Date of Patent: Jan. 15, 2008

(54) DOCUMENT COMPRESSION SCHEME THAT SUPPORTS SEARCHING AND PARTIAL DECOMPRESSION

(75) Inventor: Olcan Sercinoglu, Mountain View, CA (US)

(73) Assignee: Google, Inc.

( * ) Notice: Subject to any disclaimer, the term of this patent is extended or adjusted under 35 U.S.C. 154(b) by 594 days.

(21) Appl. No.: 10/444,761

(22) Filed: May 23, 2003

(51) Int. Cl.
 *G06F 7/00* (2006.01)
 *G06F 17/00* (2006.01)
(52) U.S. Cl. .............................. 707/2; 707/3; 707/101
(58) Field of Classification Search ...................... None
 See application file for complete search history.

(56) References Cited

U.S. PATENT DOCUMENTS 5,953,723 A * 9/1999 Linoff et al. ................ 707/102
6,493,707 B1 * 12/2002 Dey et al. ...................... 707/3
6,907,598 B2 * 6/2005 Fraser ........................ 717/127
2003/0061025 A1 * 3/2003 Abir ............................... 704/7
2004/0126026 A1 * 7/2004 He .............................. 382/239

* cited by examiner

*Primary Examiner*—Susan Chen
(74) *Attorney, Agent, or Firm*—Park, Vaughan & Fleming LLP

(57) ABSTRACT

One embodiment of the present invention provides a system that facilitates accessing a compressed representation of a set of documents, wherein the compressed representation supports searching and partial decompression. During operation, the system receives a search request containing terms to be searched for in the set of documents. In response to the search request, the system identifies occurrences of the terms in the set of documents by following pointers through the compressed representation. This compressed representation encodes occurrences of a term as a pointer to the next occurrence of the term to facilitate rapid enumeration of the occurrences of the term. Moreover, the compressed representation maintains sequential ordering between adjacent terms in the set of documents, which allows fast access to neighboring terms.

42 Claims, 6 Drawing Sheets

DOCUMENT COMPRESSION SCHEME THAT SUPPORTS SEARCHING AND PARTIAL DECOMPRESSION

BACKGROUND

1. Field of the Invention

The present invention relates to techniques for storing documents in computer systems. More specifically, the present invention relates to a document compression scheme that supports both searching and efficient decompression of portions of documents.

2. Related Art

The relentless growth of the Internet is making it increasingly harder for search engines to comb through the billions of web pages that are presently accessible through the Internet. Search engines typically operate by identifying web pages containing occurrences of specific terms (i.e. words) within these documents. For example, a search engine might search for all web pages containing the terms "military" and "industrial". A search engine can also search for web pages containing a specific phrase, such as "flash in the pan".

Existing search engines generally use an "inverted index" to facilitate searching for occurrences of terms. An inverted index is a lookup structure that specifies where a given term occurs in the set of documents. For example, an entry for a given term in the inverted index may contain identifiers for documents in which the term occurs, as well as offsets of the occurrences within the documents. This allows documents containing the given term to be rapidly identified.

Referring to FIG. 1, a search engine 112 generally operates by receiving a query 113 from a user 111 through a web browser 114. This query 113 specifies a number of terms to be searched for in the set of documents. In response to query 113, search engine 112 uses inverted index 110 to identify documents that satisfy the query. Search engine 112 then returns a response 115 through web browser 114, wherein the response 115 contains references to the identified documents.

Documents can also be stored in compressed form in a separate compressed repository 106. This allows documents or portions of documents (snippets) to be easily retrieved by search engine 112 and to be displayed to user 111 through web browser 114.

As is illustrated in FIG. 1, web crawler 104 continually retrieves new documents from web 102. These new documents feed through a compressor 105, which compresses the new documents before they are stored in compressed repository 106. The new documents also feed through indexer 108, which adds terms from the new documents into inverted index 110.

The inverted index 110 illustrated in FIG. 1 can be used to efficiently identify specific terms in documents. However, because the inverted index 110 loses the ordering of the terms, searches that match multi-word portions of the document (as in a phrase search) would require position information (offsets) for the individual terms to be retrieved and aligned in order to match the proper ordering required by the query. This process can be time consuming.

Furthermore, storing the documents in both inverted index form and compressed form is wasteful in terms of storage space because these forms largely contain the same information. Note that this wastefulness leads to considerable additional cost for storage when billions of web pages are stored on the system.

Hence, what is needed is a method and an apparatus for compressing documents in a manner that supports both searching and decompression of portions of documents without the above-described problems.

SUMMARY

One embodiment of the present invention provides a system that facilitates accessing a compressed representation of a set of documents, wherein the compressed representation supports searching and partial decompression. During operation, the system receives a search request containing terms to be searched for in the set of documents. In response to the search request, the system identifies occurrences of the terms in the set of documents by following pointers through the compressed representation. This compressed representation encodes occurrences of a term as a pointer to the next occurrence of the term to facilitate rapid enumeration of the occurrences of the term. Moreover, the compressed representation maintains sequential ordering between adjacent terms in the set of documents, which allows fast access to neighboring terms.

In a variation on this embodiment, the terms in the search request are received in textual form. In this variation, prior to identifying occurrences of terms, the system converts the terms from textual form into corresponding term identifiers.

In a further variation, identifying occurrences of a term involves using a corresponding term identifier to look up a pointer to a first occurrence of the term in the compressed representation. It also involves following a chain of pointers starting at the first occurrence to identify other occurrences of the term in the compressed representation.

In a variation on this embodiment, every $K^{th}$ occurrence of a term in the compressed representation includes a term identifier, which allows the term identifier to be obtained by following at most K (on average K/2) pointers given any occurrence of the term in the compressed representation.

In a variation on this embodiment, a corresponding term identifier is included on average every Kth occurrence of the term in the compressed representation.

In a variation on this embodiment, a corresponding term identifier is included with an occurrence of a term based on the position of the occurrence in the compressed representation.

In a variation on this embodiment, if the search request involves searching for a phrase containing multiple terms, the system looks up occurrences of a least frequent term in the phrase, and then detects phrase matches by decoding neighboring terms for each occurrence of the least frequent term.

In a variation on this embodiment, the system generates the compressed representation by encoding at least some occurrences of a term as a byte difference to the next occurrence of the term. In doing so, the system maintains sequential ordering of terms in the set of documents. The system also includes a corresponding term identifier with every $K^{th}$ occurrence of the term, whereby the parameter K can be varied to trade off space with decoding performance. The system additionally constructs a term offset table containing an offset of a first occurrence of each term in the compressed representation.

In a variation on this embodiment, the system decompresses a region surrounding an occurrence of a term, by scanning through neighboring terms in the compressed representation, and following pointers between occurrences of the neighboring terms to locate term identifiers for the neighboring terms. If the textual form is desired for the neighboring terms, the system uses the term identifiers to look up a textual form for each of the neighboring terms in a term dictionary. The neighboring terms can also be used for document scoring purposes (i.e. for assigning a relevance score given a query).

In a variation on this embodiment, the system decompresses a document in the set of documents, by scanning through occurrences of terms in the compressed representation of the document, and following pointers from the occurrences of the terms to locate term identifiers for the terms. The system uses the term identifiers to look up a textual form for each of the terms in the document in a term dictionary.

In a variation on this embodiment, the system uses a document offset table to identify documents associated with occurrences of terms.

In a variation on this embodiment, a pointer between occurrences of a term is encoded as a byte difference between the occurrences.

In a variation on this embodiment, the system speeds up the sequential processing of documents and terms in the compressed representation by keeping track of the next occurrence of each term, thus avoiding the decoding cost (i.e. K/2 hops on the average case) paid for random access. Note that it is possible to keep track of the next occurrence of only a limited number of the most popular terms in order to get most of the speed up while using significantly less storage (for the next occurrences).

Hence, the present invention introduces a technique for compressing the documents, in which the compressed representation is also an inverted index, and in which the documents can be efficiently and partially decompressed. An immediate consequence of this fact is a savings in space over existing systems that maintain a separate inverted index in addition to a compressed representation of full document contents. A secondary consequence is that the performance characteristics are quite different from existing systems that use a separate inverted index.

From the perspective of a relevance scoring algorithm (i.e. an algorithm that assigns a relevance score to a document given a query), given a term in a document, the present invention allows fast access to neighboring terms (terms before and/or after the term). This speed is due to the "partial" decompressibility of the representation. Moreover, the inverted-index feature of the data structure can be used to locate the query terms, and the nearby (potentially non-query) terms can be decoded to provide additional information to be used in scoring. Thus, the present invention allows neighboring terms to be readily available to a document-scoring algorithm for a query.

BRIEF DESCRIPTION OF THE FIGS.

Figure 5:
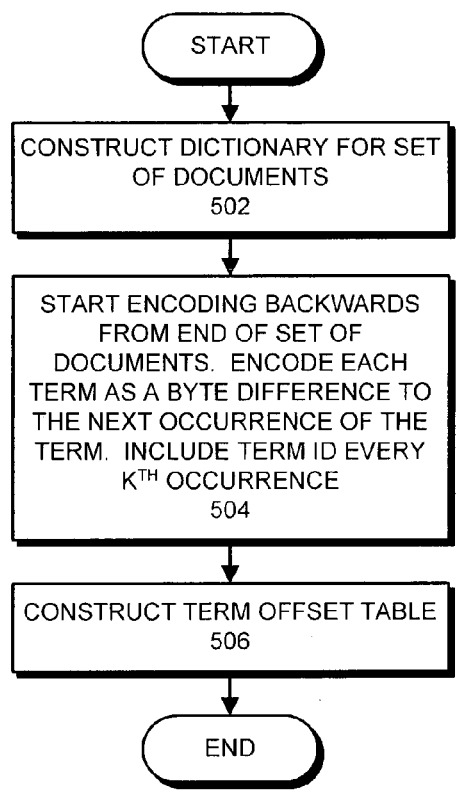

FIG. 5 presents a flow chart illustrating how data structures involved in the document searching process are constructed in accordance with an embodiment of the present invention.

Figure 6:
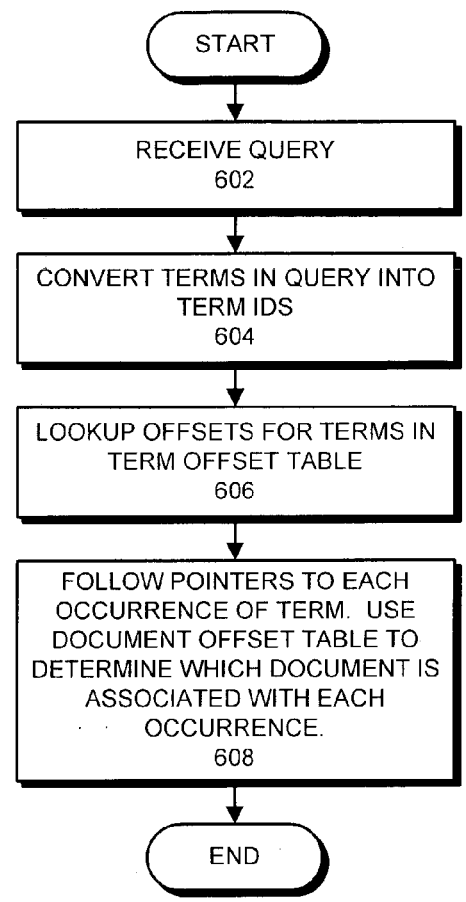

FIG. 6 presents a flow chart illustrating how a query is processed in accordance with an embodiment of the present invention.

Figure 7:
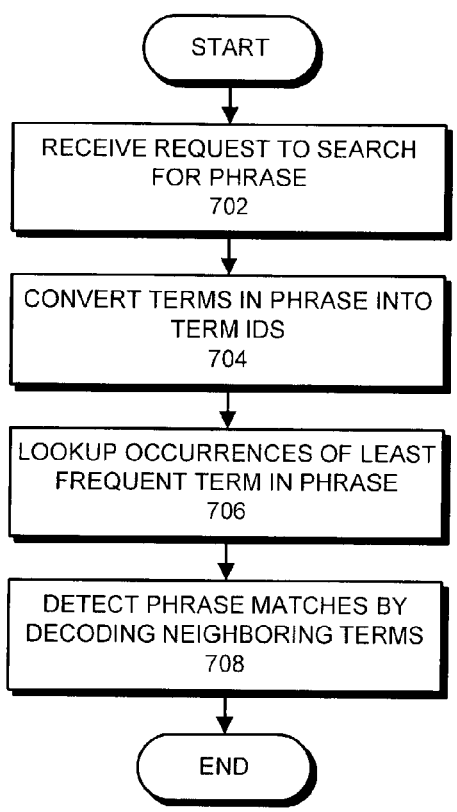

FIG. 7 presents a flow chart illustrating how a query involving a phrase match is processed in accordance with an embodiment of the present invention.

Figure 8:
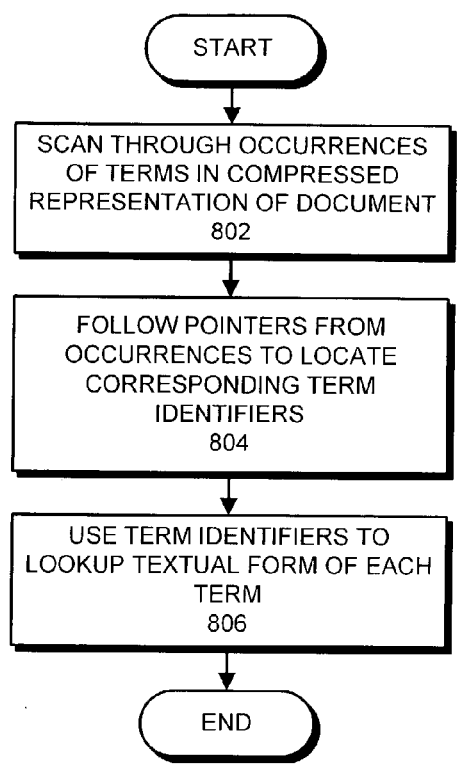

FIG. 8 illustrates how a document is decompressed in accordance with an embodiment of the present invention.

Figure 9:
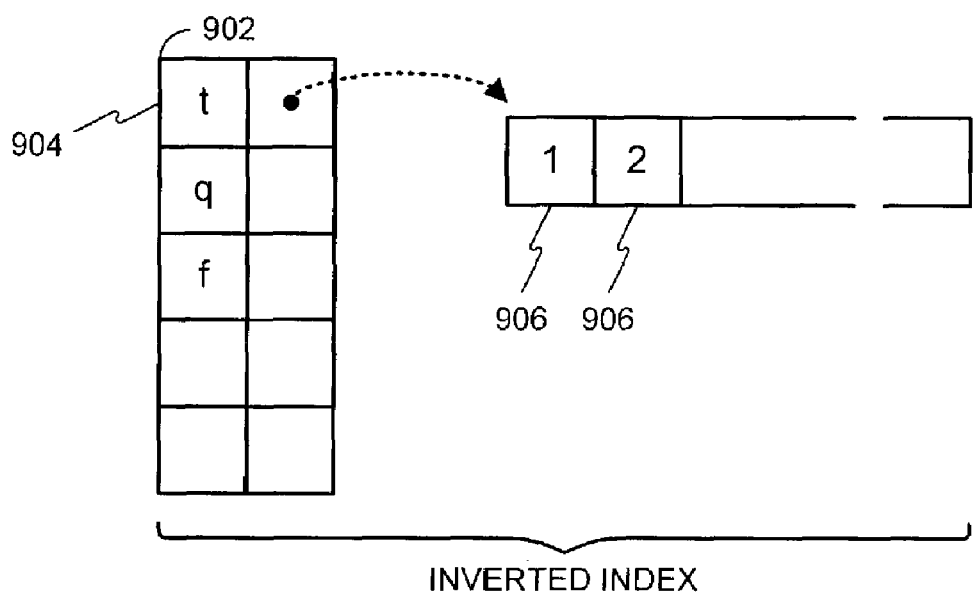
Figure 9:
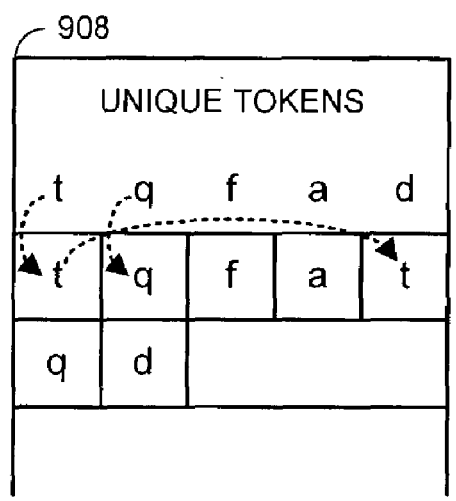

FIG. 9 illustrates how an inverted index can be combined with repositories in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Document Searching System

Figure 1:
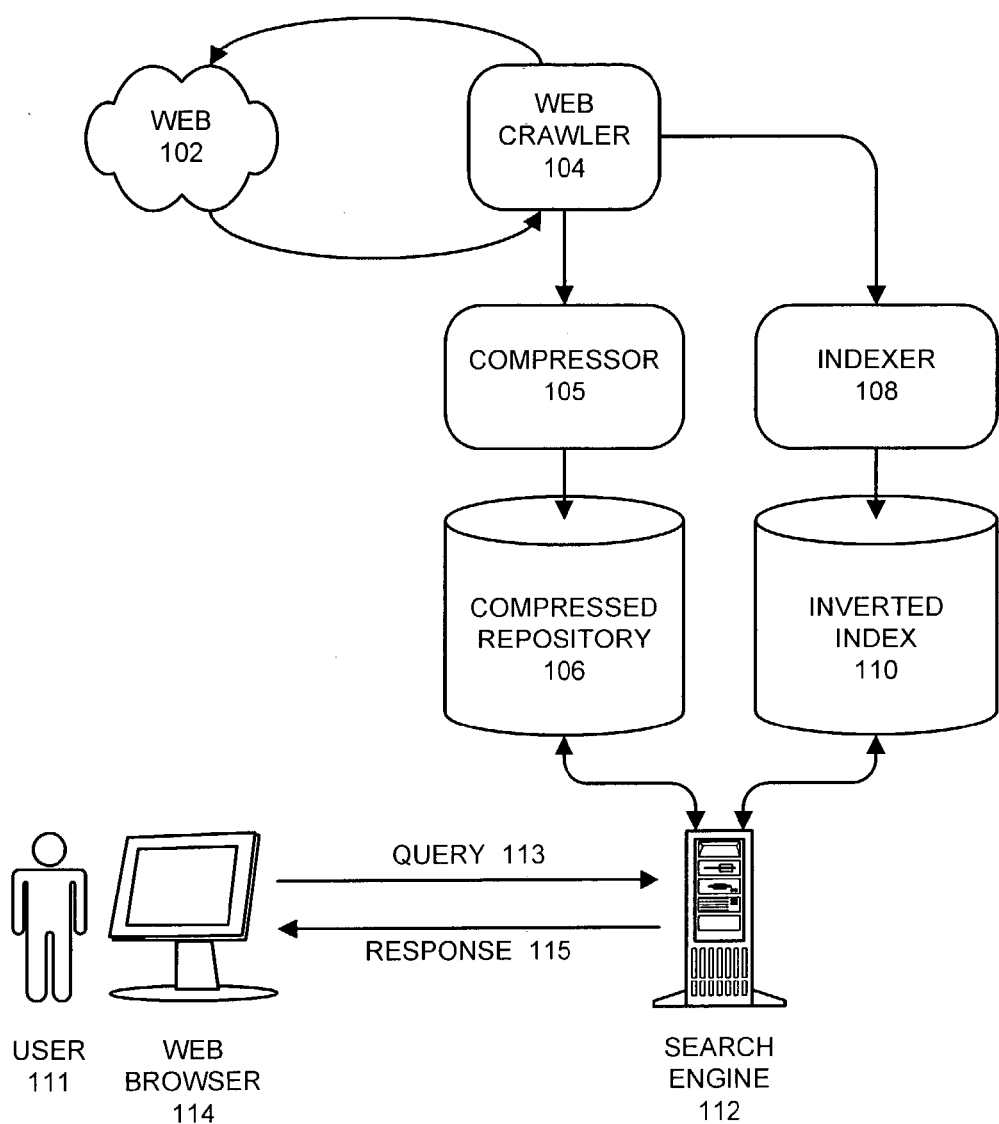
FIG. 1 illustrates a document searching system.
Figure 2:
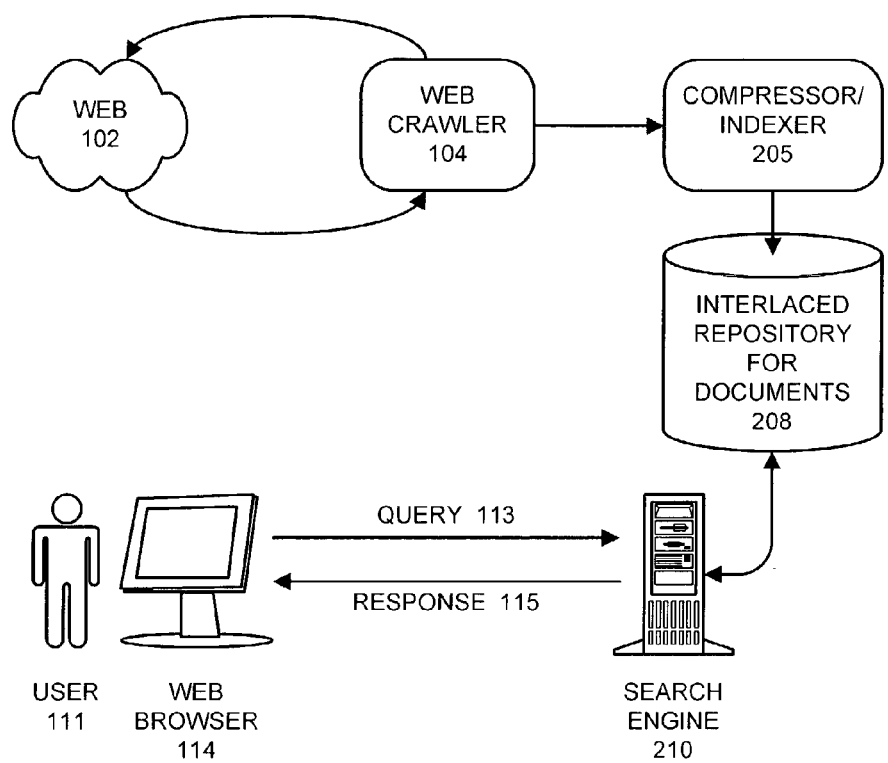
FIG. 2 illustrates a document searching system in accordance with an embodiment of the present invention.

FIG. 2 illustrates a document searching system in accordance with an embodiment of the present invention. Unlike the system illustrated in FIG. 1, the system illustrated in FIG. 2 stores documents in a single "interlaced" repository 208. This interlaced repository 208 functions as an inverted index, which allows search engine 210 to efficiently locate occurrences of specific terms in interlaced repository 208. At the same time, interlaced repository 208 maintains ordering between adjacent terms in each document. This allows documents or portions of documents to be easily decoded, which facilitates rapid phrase searches. Note that decoding a term simply requires following at most K pointers to locate the term identifier (which is encoded on every $K^{th}$ occurrence).

As in the system illustrated in FIG. 1, the system illustrated in FIG. 2 includes a web crawler 104, which continually retrieves new documents from web 102. These new documents feed through compressor/indexer 205 to be added to interlaced repository 208.

Note that a "term" can include any contiguous string of characters or punctuation marks within a document. For example, a term can include a word, an HTML tag or a punctuation mark. A term can also be referred to as a "token."

Interlaced Repository

Figure 3:
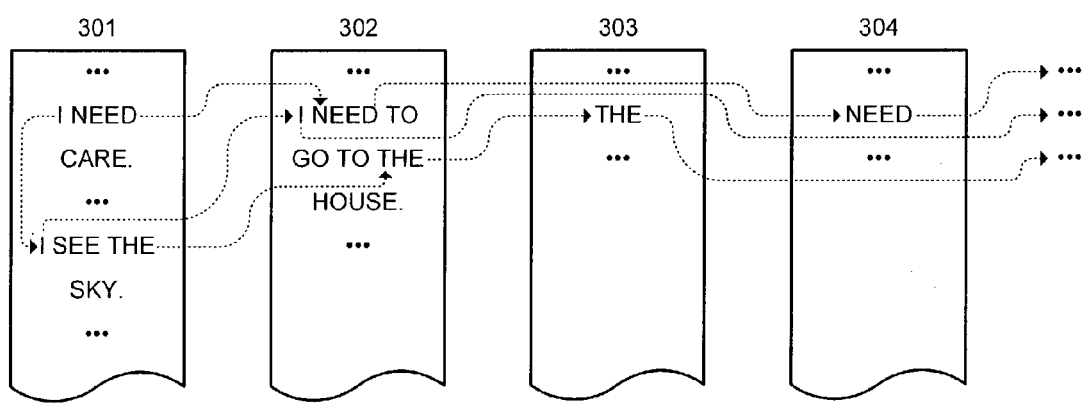
FIG. 3 illustrates how an interlaced repository for documents is structured in accordance with an embodiment of the present invention.

FIG. 3 illustrates how an interlaced repository for documents is structured in accordance with an embodiment of the present invention. Interlaced repository 208 contains a collection of documents 301-304 (which are represented as rectangles in FIG. 3). Each term in a document is represented as a pointer to the next occurrence of the term. For example, in FIG. 3, a first occurrence of the term "I" in document 301 points to a second occurrence in document 301, which points to an occurrence in document 302, which points to an occurrence in a following document. Similarly, the occurrence of the term "the" in document 301 points to an occurrence in document 302, which points to an occurrence in document 303, which points to an occurrence in a following document. Finally, the occurrence of the term "need" in document 301 points to an occurrence in document 302, which points to an occurrence in document 304, which points to an occurrence in a following document.

Note that every $K^{th}$ occurrence of the term, we can encode an identifier for the term. This allows a term to be decoded by following K/2 occurrences on average.

Data Structures

Figure 4:
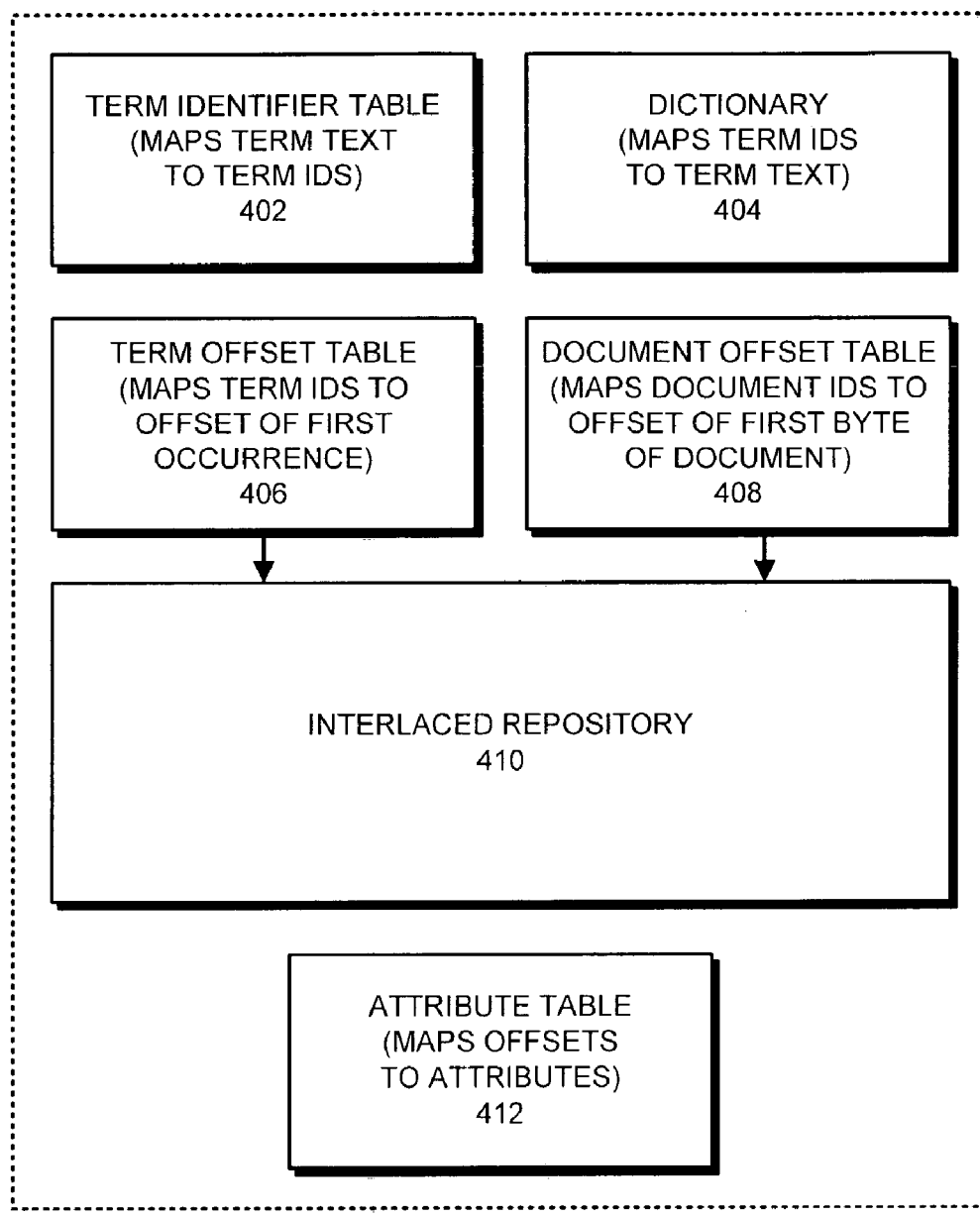
FIG. 4 illustrates a number of data structures used in the document searching process in accordance with an embodiment of the present invention.

FIG. 4 illustrates data structures involved in the document searching process in accordance with an embodiment of the present invention. These data structures include term identifier table 402, dictionary 404, term offset table 406, document offset table 408, interlaced repository 410 and attribute table 412.

Term identifier table 402 can generally include any type of lookup structure that can be used to map the textual form of a term to a corresponding term identifier. In one embodiment of the present invention, term identifier table 402 is implemented as a hash table.

Dictionary 404 performs the inverse mapping. It maps term identifiers to corresponding term text. In one embodiment of the present invention, dictionary 404 is implemented as an array of pointers, wherein each pointer references a string containing the corresponding term text. In this embodiment, the term identifier is simply the array location of the corresponding pointer for the term. In this way, the term identifier can be used to lookup the pointer for the term, and the pointer can be used to obtain the term text.

Note that the array entries may be sorted by frequency of the corresponding terms. In this way, more frequently occurring terms have smaller term identifiers. This allows the relative frequencies of terms to be easily obtained by comparing term identifiers. This can also save significant space since term identifiers are encoded (on every Kth occurrence) as part of the interlaced repository and more frequent terms would have lower term identifiers and thus take less space to encode.

Interlaced repository 410 contains a set of documents in compressed form. Each term in interlaced repository 410 is encoded as a pointer to the next occurrence of the same term, which can be located in the same document or a following document. In one embodiment of the present invention, these pointers are encoded as byte differences between consecutive occurrences of the term. Note that more frequently occurring terms generally have smaller byte differences, which allows them to be encoded with fewer bytes in a variable-length code.

Term offset table 406 maps term identifiers to the offset of the first occurrence of each term in interlaced repository 410. This allows a first occurrence of a term to be easily identified/located. Similarly, document offset table 408 maps document identifiers to the first byte/term of a corresponding document in interlaced repository 410.

Finally, attribute table 412 maps offsets in interlaced repository 410 to corresponding document attributes, such as font size, underlining, or any other document attribute. This allows more per-token information to be available for scoring a document given a query.

Note that because interlaced repository 410 preserves the ordering of terms within documents, and because consecutive terms tend to have the same attributes (e.g. font size), we can alternatively compress the attribute information within interlaced repository 410 using run-length encoding. In this case, determining the attributes for a given term simply involves performing a binary search on the decompressed form of this structure.

Process of Constructing Data Structures

FIG. 5 presents a flow chart illustrating how data structures involved in the document searching process are constructed in accordance with an embodiment of the present invention. The system starts by constructing a dictionary of terms for the set of documents, such that each term is mapped to a dense range (e.g. 0 to N where N is the number of unique terms) (step 502). It is preferable but not necessary for this dictionary to be sorted by frequency so that more frequent terms are given a smaller value in the dense range (e.g. the word "the" may have a value of 0). The value in this dense range is called the "term identifier."

In one embodiment of the present invention, the system scans over a subset of the set of documents to construct a base dictionary roughly a few million terms in size. For each unique term, the base dictionary contains a 32-bit integer term identifier as well as the number of occurrences for the term. The final base lexicon is sorted by the occurrence counts so that more frequent terms have lower term identifiers. In other words, the $N^{th}$ most popular term gets a term identifier of N. This frequency ordering helps save space, especially if the K parameter is low. This ordering is also intuitive and may be helpful at scoring time.

The base dictionary is used for encoding other portions of the set of documents. Terms that are not found in the base lexicon are added to a "secondary lexicon," wherein term identifiers in the secondary lexicon are offset by the last termid in the base lexicon. This is reasonable because we expect these exceptional terms to be very rare, which justifies the high term identifiers.

Next, in one embodiment of the present invention, the system starts encoding backwards from the end of the set of documents, and encodes each document term as a byte difference to the next occurrence of the term in the compressed representation, which may be in the same document or in a different document (step 504). On the last occurrence of the term, a special value of 0 may be used to indicate this special case, since 0 cannot be a valid delta otherwise. Note that we are assuming that the encoding used for the individual term occurrences is a byte-aligned encoding scheme. It is conceivable to use other bit-aligned encoding schemes that would use bit deltas instead, but we chose byte-alignment for both decoding efficiency and conceptual simplicity. Also note that if the encoding scheme is decodable backwards, it makes it possible to explore the neighborhood surrounding a term occurrence by moving backward as well as forward.

In one embodiment of the present invention, every K occurrences of a term, we encode the term itself as determined from the dictionary. Note that a frequency-sorted dictionary would give better average-case space complexity for encoding the term identifiers, though such frequency-sorted dictionary need not be used. We also encode the term identifier on the last occurrence. Note that this means given an occurrence of a term, we can "decode" or "decompress" the term (i.e. find out what term it is), by following K/2 occurrences on average, since it takes between 0 and K occurrences to reach the point where the term identifier was also encoded.

Note that is it also possible to vary K for different terms. In some cases a few rarely-occurring terms may be searched for much more than others, in which case it may make sense to tilt the tradeoff towards decoding speed for just those terms. Because these terms are already rare, decreasing K just for these terms would not hurt overall space usage very much, but can potentially speed up the system for the average user.

Finally, the system constructs a term offset table 406 which points to the first occurrence of each term (step 506).

Query Processing

FIG. 6 presents a flow chart illustrating how a query is processed in accordance with an embodiment of the present invention. Upon receiving a query (step 602), the system uses term identifier table 402 to generate term identifiers for the terms in the query (step 604). Next, the system uses the term identifiers to lookup offsets for the first occurrence of each term in term offset table 406 (step 606). Finally, the system follows pointers between each occurrence of the terms of interest (step 608). In doing so, the system can use document offset table 408 to determine which document is associated with each occurrence. Given the offset of an occurrence of a term, we can determine the corresponding document identifier by performing a moving binary search in document offset table 408. Note that for popular terms, skip tables can be generated in order to avoid hopping through all occurrences of the token in order to reach a particular occurrences in the repository.

Note that an OR search involves identifying documents that contain any of the terms in the query, whereas an AND search involves identifying documents that contain all of the terms in the query. An alternative approach for an AND search, which may become feasible if K is very small (e.g. 2), is to actually search for the other more frequent terms within the documents that contain the less frequent terms. The cost of this operation may be acceptable for very low K, and of course depending on how popular the individual terms are.

Query Involving a Phrase Match

FIG. 7 presents a flow chart illustrating how a query involving a phrase match is processed in accordance with an embodiment of the present invention. The system starts by receiving a request to search for a phrase containing a number of terms (step 702). The system then converts the terms in the phrase into term identifiers (step 704). Next, the system looks up occurrences of the least frequent term in the phrase (step 706). The system then detects phrase matches by decoding neighboring terms (step 708). Note that because interlaced repository 208 maintains ordering of terms, it is possible to quickly identify neighboring terms (by following their pointers up to K times to locate the term identifiers) to determine if there exists a phrase match.

Document Decompression

FIG. 8 illustrates how a document (or a portion of a document) is decompressed in accordance with an embodiment of the present invention. The system starts by scanning through occurrences of terms in the compressed representation of the document in interlaced repository 208 (step 802). Note that a pointer to the document can be obtained by performing a lookup in document offset table 408. Next, the system follows pointers from the occurrences of terms in the compressed representation to locate corresponding term identifiers for the terms (step 804). Finally, the system uses the term identifiers to look up the textual form of each term (step 806). The system can additionally access attribute table 412 to determine attributes for the terms.

Advantages

In the above-described dictionary-based compression scheme, each document can be "decompressed" partially (term by term) and efficiently (with K/2 memory lookups on average). Also, this compression scheme is "continuously adaptive" since the difference between the occurrences would be smaller (thus more compact to encode) for more frequent terms. Thus, the present invention allows documents to be decoded efficiently and partially (term by term). Note that because decoding a term involves hops through the data structure, a storage medium that is fast for random access, such as RAM, is efficient for decompression.

The parameter K provides an easily adjustable trade-off between space and decoding time. A lower K gives better decompression performance while a higher K requires less space since the term identifier is encoded less often.

The above-described compressed representation may allow much better compression of term attributes such as font type and size because per-term attributes tend to be the same for consecutive terms.

Note that the compressed representation can be extended easily by adding new documents at the end. This only requires a modification on the previous global last occurrence of each term, and perhaps an expansion of the dictionary if some of the terms are not found in the existing dictionary. To get to the last global occurrence, we can follow the encoded deltas, or we can maintain a separate "last occurrence table" similar to the above-mentioned term offset table 406, which points to first occurrences.

This data structure can be used for not only searching (as described below), but also for the sequential processing of the documents for other purposes that can work with a pre-parsed representation of the documents. Note that the K/2 hops on average for decoding each term would not be necessary for simple sequential processing if we also keep track of the next occurrence of each term. This type of a multi-purpose data structure is particularly attractive for a search engine research (and development) environment where researchers/developers will routinely want to process the documents sequentially, and can do so over the same data structure that they use for searching.

Note that the above-described scheme does not require a separate inverted index and thus saves space. Also note that it provides good compression for the terms since it is adaptive and based on a global dictionary.

Typically, given a query, the performance bottleneck is the time it takes to decode the occurrences (which are typically delta encoded to save space, and thus have to be followed from the beginning) of the most frequently occurring term, especially if this term is a so-called stop-word such as "the". The present invention allows the search engine to simply look at the documents that contain the least popular term (by decoding its occurrences). This allows the search engine to decode other terms in the document to see if any of the other terms match more popular terms in the query. If so, the search engine can simply advance to that position in the "linked list of occurrences" for the other (more popular) terms.

Note that to reduce the number of other terms that need to be decoded, we can start decoding from the region of the least-popular term, since the other terms would most likely occur in that region. However, if we want to know all occurrences of the other (more frequent) query-terms in the document, we can start decoding from the beginning of the document. In either case, the expected number of terms to be decoded depends on the popularity of the other query terms, and thus generally would be lowest for stop-words which occur most frequently.

In the worst case, we would decode all other terms in the document, and if we do not find the other query terms, we would simply move on to the next occurrence of the least-popular term. Note that depending on the search, we may choose to ignore occurrences of the other (more popular) terms if they are not within a certain distance of the least-popular term, in which case the worst-case time complexity would be improved. In either case, the average-time complexity would be $O(K*L*D*N)$ where K is the term identifier encoding frequency (discussed earlier), L is the length of the query, D is the average number of unique terms in a document, and N is the number of occurrences of the least frequent term. The "hidden constant" would depend primarily on the properties of the language of the documents and of course the query.

Note that in particular, phrase matches would become much faster since we would only need to decode a limited number of terms that are immediately after or before the least-popular term. This operation would have the time complexity $O(K*L*N)$ where K is the term identifier encoding frequency (discussed earlier), L is the length of the phrase, and N is the number of occurrences of the least-frequent term in the phrase.

This scheme also has certain advantages for handling complex scoring schemes that may or may not look at other (non-query) terms in the document. Note that because we can decompress the document term-by-term, the search engine can employ lazy, incremental decompression that would work well for a multi-layer scoring algorithm that requires more information at each layer. The lowest layers of this algorithm would perform the least-costly operations that are typically viewed as the "document selection" activity in a search engine, while higher layers perform increasingly complex scoring of the document for the given query.

For example, the lowest layer may perform the AND operation that is commonly used in today's search engines, while a second (higher) layer may use a complex machine learning algorithm that requires a lot of CPU. Only documents that pass the AND-layer would be scored at the second layer, thus saving time in the average case, assuming the second layer takes more time than the first and the document does not always pass the first layer. Note that any test (e.g. AND, OR, etc) on the query terms would be very fast since we already know the query terms and thus we would not have to go through the K/2 hops necessary for decoding unknown terms in the average case.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

Additional Embodiments

In one embodiment of the present invention, the above-described dictionary-based compression scheme is used in combination with techniques used in existing search engines, such as an exemplary search engine described in the article S. Brin and L. Page, "The Anatomy of a Large-Scale Hypertextual Search Engine," Seventh International World Wide Web Conference, Brisbane, Australia and in U.S. Pat. No. 6,285,999 (both incorporated herein by reference). Instead of a single repository 208, multiple repositories may be used.

Each repository may represent, for example, a subset of the documents to be stored, such as a set of documents grouped according to similarity in topic or concept, and/or grouped using known information retrieval techniques (such as term frequency, inverse document frequency etc.). A repository may also represent a single document, a portion of a document, portions of several documents, or any other arrangement of documents, portions of documents, terms, tokens, etc. In one embodiment of the present invention described with reference to FIG. 9, an inverted index 902 may be combined with repositories 908; for example, inverted index 902 may be used to index a term 904 into documents (or e.g. groups of documents) 908 by identifying the documents (or e.g. groups of documents) in which the term appears. This indexing may be accomplished using document identifiers 906, or by any other method. Within the repositories 908 (e.g. document, or group of documents), the methods described previously may be used to encode terms, such as term 904, as pointers to the next occurrence of the terms. Within each repository 908, terms may be identified and encoded according to the techniques discussed with reference to FIG. 4. Documents (or e.g. groups of documents) 906 in which term 904 appears may thus be identified without the need to traverse an entire repository 208 by following pointers. In addition, because inverted index 902 may store document (or e.g. group of documents) identifying information 906 in adjacent memory locations, data locality may be improved with respect to a lookup for term 904.

In other embodiments of the present invention, term identifiers need not be encoded every Kth occurrence of the term but may rather be encoded based on other criteria. For example, in a byte-aligned encoding scheme in which pointers and term identifiers are encoded using two bytes of data, a term identifier may be encoded when the term identifier ends on a M-byte boundary (e.g. M=32) within the compressed repository. If there are a large number of occurrences of the term, statistically the term identifier will be encoded on average every M/2 occurrences of the term (in the above case, corresponding to K=16). In such embodiments, the presence of an encoded term identifier may be detected (e.g. based on location within the data structure) without the need to parse the data itself. Because there is no need to set flags or use other mechanisms within the data structure to signal a term identifier, encoding efficiency may be improved. Of course, the foregoing example is by way of illustration only, and the frequency of term identifier encoding, as well as other criteria (such as whether identifiers end or begin on a M-byte boundary, the choice of M, the amount of data used to encode the term identifier, whether byte-aligned, bit-aligned or other encoding schemes are chosen, etc.) may all be adjusted consistent with the present invention.

As used in this specification, a "document" is to be broadly interpreted to include any machine-readable or machine-storable work product. A document may be a file, a combination of files, one or more files with embedded links to other files, etc. The files may be of any type, such as text, audio, image, 20 video, etc. In the context of the Internet, a common document is a Web page.

What is claimed is:

1. A method for accessing a compressed representation of a set of documents, comprising:
   storing the set of documents in a compressed representation;
   encoding a term within a document as a pointer to a next occurrence of the term in the documents, wherein the pointer is encoded as a byte difference between the encoded term and the next occurrence of the term in the set of documents;
   maintaining a sequential ordering between adjacent terms in the documents;
   receiving a search request containing terms to be searched for in the set of documents;
   converting the terms in the search request into corresponding term identifiers based on a term identifier table, wherein the term identifier table is a lookup structure that maps the textual form of a term to corresponding hash term identifiers; and
   identifying occurrences of the terms in the set of documents by:
      using the corresponding term identifiers for the terms in the search request to look up a term offset table for a pointer to a first occurrence of the terms in the compressed representation of the set of documents; and
      following a chain of pointers starting at the first occurrence to identify other occurrences of the terms in the compressed representation of the set of documents; and
      responding to the search request with identification of occurrences of the terms in the search request within the set of documents.

2. The method of claim 1,
   wherein the terms in the search request are received in textual form.

3. The method of claim 2, wherein every $K^{th}$ occurrence of a term in the compressed representation includes a term identifier, which allows the term identifier to be obtained by following at most K pointers given any occurrence of the term in the compressed representation.

4. The method of claim 2, wherein a corresponding term identifier is included on average every Kth occurrence of the term in the compressed representation.

5. The method of claim 2, wherein a corresponding term identifier is included with an occurrence of a term based on the position of the occurrence in the compressed representation.

6. The method of claim 1, wherein if the search request involves searching for a phrase containing multiple terms, the method additionally involves:
   looking up occurrences of a least frequent term in the phrase; and
   detecting phrase matches by decoding neighboring terms for each occurrence of the least frequent term.

7. The method of claim 1, further comprising generating the compressed representation by:
   encoding at least some occurrences of a term as a byte difference to the next occurrence of the term while maintaining sequential ordering of terms in the set of documents;
   including a corresponding term identifier with every $K^{th}$ occurrence of the term, whereby the parameter K can be varied to trade off space with decoding performance; and
   constructing a term offset table containing an offset of the first occurrence of each term in the compressed representation.

8. The method of claim 1, further comprising decompressing a region surrounding an occurrence of a term, by:
   scanning through neighboring terms in the compressed representation; and
   following pointers between occurrences of the neighboring terms to locate term identifiers for the neighboring terms.

9. The method of claim 8, wherein if a textual form is desired for the neighboring terms, the method further comprises using the term identifiers to look up the textual form for each of the neighboring terms in a term dictionary.

10. The method of claim 8, further comprising using the neighboring terms for document scoring purposes.

11. The method of claim 1, further comprising decompressing a document in the set of documents, by:
   scanning through occurrences of terms in the compressed representation of the document;
   following pointers from the occurrences of the terms to locate term identifiers for the terms; and
   using the term identifiers to look up a textual form for each of the terms in the document in a term dictionary.

12. The method of claim 1, wherein the method further comprises using a document offset table to identify documents associated with occurrences of terms.

13. The method of claim 1, wherein a pointer between occurrences of a term is encoded as a byte difference between the occurrences.

14. The method of claim 1, wherein if the access to the set of documents is sequential, the method further comprises keeping track of the next occurrence of each term in order to avoid the decoding cost when the next occurrence of the same term is accessed.

15. A computer-readable storage medium storing instructions that when executed by a computer cause the computer to perform a method for accessing a compressed representation of a set of documents, the method comprising:
   storing the set of documents in a compressed representation;
   encoding a term within a document as a pointer to a next occurrence of the term in the documents, wherein the pointer is encoded as a byte difference between the encoded term and the next occurrence of the term in the set of documents;
   maintaining a sequential ordering between adjacent terms in the documents;
   receiving a search request containing terms to be searched for in the set of documents;
   converting the terms in the search request into corresponding term identifiers based on a term identifier table, wherein the term identifier table is a lookup structure that maps the textual form of a term to corresponding hash term identifiers; and
   identifying occurrences of the terms in the set of documents by:
      using the corresponding term identifiers for the terms in the search request to look up a term offset table for a pointer to a first occurrence of the terms in the compressed representation of the set of documents; and
      following a chain of pointers starting at the first occurrence to identify other occurrences of the terms in the compressed representation of the set of documents; and responding to the search request with identification of occurrences of the terms in the search request within the set of documents.

16. The computer-readable storage medium of claim 15, wherein the terms in the search request are received in textual form.

17. The computer-readable storage medium of claim 16, wherein every $K^{th}$ occurrence of a term in the compressed representation includes a term identifier, which allows the term identifier to be obtained by following at most K pointers given any occurrence of the term in the compressed representation.

18. The computer-readable storage medium of claim 16, wherein a corresponding term identifier is included on average every Kth occurrence of the term in the compressed representation.

19. The computer-readable storage medium of claim 16, wherein a corresponding term identifier is included with an occurrence of a term based on the position of the occurrence in the compressed representation.

20. The computer-readable storage medium of claim 15, wherein if the search request involves searching for a phrase containing multiple terms, the method additionally involves:
   looking up occurrences of a least frequent term in the phrase; and
   detecting phrase matches by decoding neighboring terms for each occurrence of the least frequent term.

21. The computer-readable storage medium of claim 15, wherein the method further comprises generating the compressed representation by:
   encoding at least some occurrences of a term as a byte difference to the next occurrence of the term while maintaining sequential ordering of terms in the set of documents;
   including a corresponding term identifier with every $K^{th}$ occurrence of the term, whereby the parameter K can be varied to trade off space with decoding performance; and
   constructing a term offset table containing an offset of the first occurrence of each term in the compressed representation.

22. The computer-readable storage medium of claim 15, wherein the method further comprises decompressing a region surrounding an occurrence of a term, by:
   scanning through neighboring terms in the compressed representation; and
   following pointers between occurrences of the neighboring terms to locate term identifiers for the neighboring terms.

23. The computer-readable storage medium of claim 22, wherein if a textual form is desired for the neighboring terms, the method further comprises using the term identifiers to look up the textual form for each of the neighboring terms in a term dictionary.

24. The computer-readable storage medium of claim 22, further comprising using the neighboring terms for document scoring purposes.

25. The computer-readable storage medium of claim 15, wherein the method further comprises decompressing a document in the set of documents, by:
   scanning through terms in the compressed representation of the document;
   following pointers from the occurrences of the terms to locate term identifiers for the terms; and
   using the term identifiers to look up a textual form for each of the terms in the document in a term dictionary.

26. The computer-readable storage medium of claim 15, wherein the method further comprises using a document offset table to identify documents associated with occurrences of terms.

27. The computer-readable storage medium of claim 15, wherein a pointer between occurrences of a term is encoded as a byte difference between the occurrences.

28. The computer-readable storage medium of claim 15, wherein if the access to the set of documents is sequential, the method further comprises keeping track of the next occurrence of each term in order to avoid the decoding cost when the next occurrence of the same term is accessed.

29. An apparatus that accesses a compressed representation of a set of documents, comprising:
   a storage mechanism for storing the set of documents in a compressed representation;
   an encoding mechanism for encoding a term within a document as a pointer to a next occurrence of the term in the documents, wherein the pointer is encoded as a byte difference between the encoded term and the next occurrence of the term in the set of documents;
   an ordering mechanism for maintaining a sequential ordering between adjacent terms in the documents;
   an input mechanism configured to receive a search request containing terms to be searched for in the set of documents;
   a searching mechanism configured to:
      convert the terms in the search request into corresponding term identifiers based on a term identifier table, wherein the term identifier table is a lookup structure that maps the textual form of a term to corresponding hash term identifiers;
      identify occurrences of the terms in the set of documents by:
         using the corresponding term identifiers for the terms in the search request to look up a term offset table for a pointer to a first occurrence of the terms in the compressed representation of the set of documents; and
         following a chain of pointers starting at the first occurrence to identify other occurrences of the terms in the compressed representation of the set of documents; and
   responding to the search request with the identification of occurrences of the terms in the search request within the set of documents.

30. The apparatus of claim 29, wherein the terms in the search request are received in textual form.

31. The apparatus of claim 30, wherein every $K^{th}$ occurrence of a term in the compressed representation includes a term identifier, which allows the term identifier to be obtained by following at most K pointers between occurrences of the term in the compressed representation.

32. The apparatus of claim 30, wherein a corresponding term identifier is included on average every Kth occurrence of the term in the compressed representation.

33. The apparatus of claim 30, wherein a corresponding term identifier is included with an occurrence of a term based on the position of the occurrence in the compressed representation.

34. The apparatus of claim 29, wherein if the search request involves searching for a phrase containing multiple terms, the searching mechanism is configured to:
   look up occurrences of a least frequent term in the phrase; and to detect phrase matches by decoding neighboring terms for each occurrence of the least frequent term.

35. The apparatus of claim 29, further comprising a compression mechanism that generates the compressed representation, wherein the compression mechanism is configured to:
   encode at least some occurrences of a term as a byte difference to the next occurrence of the term while maintaining sequential ordering of terms in the set of documents;
   include a corresponding term identifier with every $K^{th}$ occurrence of the term, whereby the parameter K can be varied to trade off space with decoding performance; and to
   construct a term offset table containing an offset of the first occurrence of each term in the compressed representation.

36. The apparatus of claim 29, further comprising a decompression mechanism configured to decompress a region surrounding an occurrence of a term, wherein the decompression mechanism is configured to:
   scan through neighboring terms in the compressed representation; and to
   follow pointers between occurrences of the neighboring terms to locate term identifiers for the neighboring terms.

37. The apparatus of claim 36, wherein if a textual form is desired for the neighboring terms, the decompression mechanism is additionally configured to use the term identifiers to look up the textual form for each of the neighboring terms in a term dictionary.

38. The apparatus of claim 36, further comprising a document scoring mechanism configured to use the neighboring terms for document scoring purposes.

39. The apparatus of claim 29, further comprising a decompression mechanism configured to decompress a document in the set of documents, wherein the decompression mechanism is configured to:
   scan through terms in the compressed representation of the document;
   follow pointers from the occurrences of the terms to locate term identifiers for the terms; and to use the term identifiers to look up a textual form for each of the terms in the document in a term dictionary.

40. The apparatus of claim 29, furthering comprising a document identification mechanism configured to identify documents associated with occurrences of terms.

41. The apparatus of claim 29, wherein a pointer between occurrences of a term is encoded as a byte difference between the occurrences.

42. The apparatus of claim 29, wherein if the access to the set of documents is sequential, the method further comprises keeping track of the next occurrence of each term in order to avoid the decoding cost when the next occurrence of the same term is accessed.

* * * * *